July 11, 1972 GORO AKASHI ET AL 3,676,217

MAGNETIC RECORDING MEDIUM

Filed Aug. 4, 1969

INVENTORS

GORO AKASHI

OSAMU SUZUKI

MATSUAKI NAKAMURA

BY Sughrue, Rothwell, Mion, Zinn & Macpeak

ATTORNEYS

United States Patent Office 3,676,217
Patented July 11, 1972

3,676,217
MAGNETIC RECORDING MEDIUM

Goro Akashi, Osamu Suzuki, and Matsuaki Nakamura, Odawara-shi, Japan, assignors to Fuji Photo Film Co., Ltd., Kanagawa, Japan Filed Aug. 4, 1969, Ser. No. 847,337
Int. Cl. H01f *10/06*
U.S. Cl. 117—239 8 Claims

ABSTRACT OF THE DISCLOSURE

Magnetic recording medium, resistant to the high-frequency damping effect of pressure, comprising a ferromagnetic recording layer and a powdery $CrO_2$-based surface layer.

This invention relates to a magnetic recording medium and, more particularly, to a magnetic recording medium having such properties that it will exhibit little decrease in reproduction output, even when the reproduction of magnetic records is performed while the medium is running under pressure.

Recently, as there have been developed various magnetic recording apparatus which enable one to record magnetic signals in high density, that is, a large number of magnetic records per unit area of the recording layer of the magnetic recording medium, there is an increasing demand for the development of a magnetic recording medium which would enable the recording of a magnetic signal in higher density.

Prior art investigations of magnetic recording have indicated that, for use in high density magnetic recording, a magnetizable material in the form of fine granules is more advantageous than one in the form of fine needles. Further, for improvement in high frequency recording characteristics, the use of magnetizable material having high coercive force is desirable in order to avoid magnetic auto-decay. There has therefore been adopted a method of improving the coercive force of such materials by utilizing an anisotropy introduced by the addition of cobalt to $\gamma$-$Fe_2O_3$ or $Fe_3O_4$. However, it has also been previously demonstrated that fine, granular, cobalt-containing $\gamma$-$Fe_2O_3$ or $Fe_3O_4$ exhibit demagnetization as a result of pressure, as compared with fine needle-shaped cobalt-free $\gamma$-$Fe_2O_3$ or $Fe_3O_4$ and that the normal high resolving power (fidelity) and high coercive force of fine granular $\gamma$-$Fe_2O_3$ or $Fe_3O_4$ are destroyed by pressure when cobalt is incorporated therein.

With regard to the influence of pressure on a magnetic recording medium when, for example, a magnetic recording tape is loaded in a recorder and run through a tape guide in the recorder, pressure is imposed on the tape and there occurs a damping effect, or loss of magnetism in the recording layer of the tape.

DESCRIPTION OF THE DRAWINGS

Referring to FIG. 1, a sharp edge 3 is forced against a magnetic recording layer 2 on support 1 of a magnetic recording medium. There occurs strain in the recording medium, the distribution of which is indicated by curves

Figure 1:
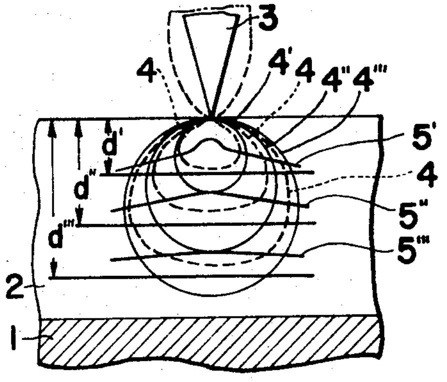
FIG. 1 is a graphical illustration indicating the distribution of stress in the magnetic layer of a magnetic recording material when a local pressure is imposed thereto.

4 and 5. Curves 4 are isotropical strain curves obtained by linking the points of the same magnitude of strain and curves 5 are stress distribution curves on planes at depths *d* from the surface of the magnetic recording layer. Curves 4', 4'' and 4''' correspond to the different magnitudes of the stresses, and curves 5', 5'' and 5''' correspond to stress distributions on planes at different depths *d'*, *d''* and *d'''*, respectively. However, the contact point of the ordinary tape running guide is not so sharp, being usually rounded as indicated in FIG. 1 by a dotted line and, in this case, there is obtained a curve 4 as indicated by a dotted line in FIG. 1. When the edge is in contact with the magnetic recording layer at a pressure of P (dyne/cm.) in FIG. 1, the maximum value $\delta$ max. of the stress $\delta$ imposed to the layer is expressed by the following equation:

$$\delta\ \text{max}=\frac{2P}{\pi d}$$

wherein *d* represents the diameter of the extent of stress. When there is imposed a pressure P of 500 g./cm. ($0.49\times10^5$ dyne/cm.), the $\delta$ max. will be:

when
$d=1$ micron: max.$=3.17\times10^3$ kg./cm.$^2$
$d=2$ microns: max.$=1.59\times10^3$ kg./cm.$^2$
$d=5$ microns: max.$=0.64\times10^3$ kg./cm.$^2$
$d=10$ microns: max.$=0.32\times10^3$ kg./cm.$^2$ The results of these calculations indicate that the influence of pressure on the magnetic layer increases with the approach to the surface of the magnetic layer and, accordingly, the closer to the surface, the greater the decay of high frequency signals caused by pressure.

Figure 2:
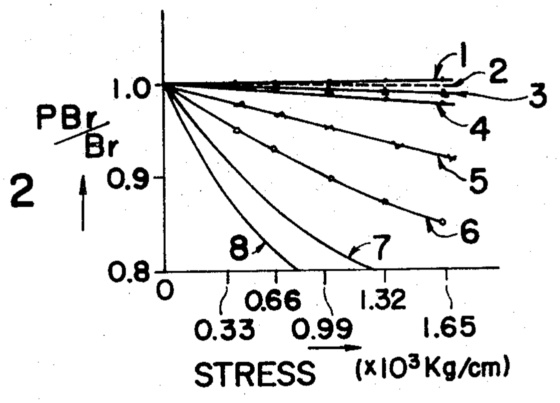
FIG. 2 are curves illustrating the relationship between stress and the ratio of magnetic characteristics under pressure to those obtained in the absence of pressure on various magnetizable materials.

In FIG. 2 there is indicated the magnetic decay caused by pressure with respect to magnetic recording media prepared using various ferromagnetics. In this figure, on the abscissa is graduated the pressure imposed on the recording layer of a magnetic recording medium in kg./cm.$^2$ and on the ordinate is graduated the magnetic decay (i.e., the ratio of residual magnetic induction under pressure to that in the absence of pressure). In FIG. 2, curve 1 corresponds to $CrO_2$, curve 2 to $Fe_3O_4$ containing 2 wt. percent cobalt and cooled in a magnetic field, curve 3 to an iron-cobalt alloy, curve 4 to $\gamma$-$Fe_2O_3$ in the form of fine needles, curve 5 to $Fe_3O_4$ having incorporated therein 2 wt. percent of cobalt, curve 6 to $\gamma$-$Fe_2O_3$ having incorporated therein 2 wt. percent of cobalt, curve 7 to fine granular $Fe_3O_4$ having incorporated therein 2 wt. percent of cobalt and curve 8 to $\gamma$-$Fe_2O_3$ having incorporated therein 2 wt. percent of cobalt. As shown in FIG. 2, it can be readily seen that $CrO_2$ possesses the best resistance to magnetic decay as a result of pressure. Hence, one solution to the above problems could involve the use of a magnetic recording layer consisting of $CrO_2$ as the sole magnetizable material. However, $CrO_2$ is, relatively, very expensive in comparison with other ferromagnetics.

We have now surprisingly discovered that, in order to avoid the adverse effects of pressure on such materials, that it is only necessary to insure that the surface portion of a magnetic recording layer is free from the influence of pressure and that one may obtain magnetic recording materials having variable magnetic characteristics suitable for use under pressure by using a $\gamma$-$Fe_2O_3$, $Fe_3O_4$ or like ferromagnetic in the lower portion only of the magnetic recording layer. The present invention is based upon these discoveries.

Briefly, the present invention comprises a magnetic recording medium having a magnetic recording layer consisting of a powdered ferromagnetic dispersed in a binder, which magnetic recording layer contains a powdery $CrO_2$-based ferromagnetic in its surface region only.

The $CrO_2$-based ferromagnetics which may be employed in the present invention include not only $CrO_2$ itself, but also various other ferromagnetics having $CrO_2$ incorporated therein. We have determined, for example, that $CrO_2$ incorporated with Te, Sb, Pt, Bi, As or the like may be effectively employed in the practice of the present invention.

The present invention will be illustrated in detail by the following example.

EXAMPLE

On one surface of a poly(etthylene terephthalate) film having a thickness of 25 microns there was formed an undercoating layer, having a dry thickness of 7 microns, from a mixture of each of a variety of compositions as indicated in the following tables. On this undercoating there was applied a surface coating layer, having a dry thickness of 2 microns, also from coating mixtures as indicated below. After the coatings were completely dried, the coated film was slit to obtain magnetic recording tapes.

TABLE I

[Composition of coating liquids for forming magnetic recording layers]

| Ingredients | Parts by weight |
|---|---|
| Powdered ferromagnetic as listed in Appendant Table | 400 |
| Vinyl chloride-vinyl acetate copolymer (Vinylite VYHH, supplied by Union Carbide Corp., USA) | 80 |
| Lecithin (dispersing agent for the ferromagnetic powder) | 5 |
| Oleic acid (lubricating agent) | 2 |
| Fluorocarbon oil anti-abrasion agent (trifluorochloroethylene, commercially available under the trade name "Kel-F", from the 3M Company) | 550 |

APPENDANT TABLE

[Kinds of finely divided ferromagnetic particles used in each sample]

| Sample No. | Undercoat layer | Surface layer |
|---|---|---|
| 1 | $\gamma$-$Fe_2O_3$ (Hc=230 oe.) | $CrO_2$ substituted with Sb (0.2 wt. percent) Hc=400 oe.). |
| 2 | $Fe_3O_4$ (Hc=270 oe.) | $CrO_2$ substituted with Sb (0.2 wt. percent) (Hc=400 oe.). |
| 3 | $\gamma$-$Fe_2O_3$ substituted with 2 wt. percent cobalt (Hc=330 oe.). | $CrO_2$ substituted with Te (0.2 wt .percent) Hc=550 oe.). |
| 4 | $Fe_3O_4$ substituted with 2 wt. percent cobalt (Hc=370 oe.). | $CrO_2$ substituted with Te (0.2 wt .percent) (Hc=550 oe.). |

For comparison, a magnetizable powder dispersion of the compositions as used in the undercoat layers of the above four samples was applied to a polyethylene terephthalate film having a thickness of 25 microns so as to form a coating film having a dry thickness of 9 microns. The resulting coated film was then slit to form magnetic recording tapes. Thus tapes having only the undercoat layers of samples 1, 2, 3 and 4 comprise, respectively, samples 5, 6, 7 and 8.

Figure 3:
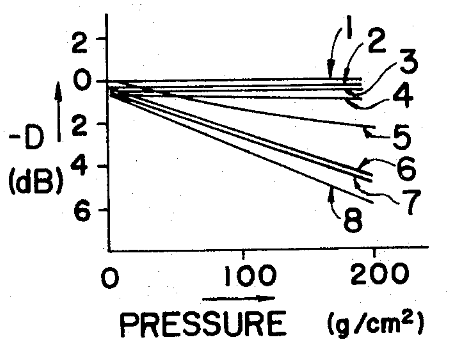
FIG. 3 are curves illustrating the relationship between stress and the reduction in amplitude of a reproduced signal caused by pressure with respect to the magnetic recording elements prepared in the examples and comparable examples hereinafter set forth.

In FIG. 3 are illustrated the relationships between decrease in output (—D) and contact pressure imposed on the tape by a magnetic head with respect to the above magnetic recording tape samples when a signal of the frequency (λ) of 9.5 microns was recorded and reproduced from the tape by means of the magnetic head. In FIG. 3, on the abscissa is graduted the contact pressure in terms of g./cm.$^2$ and on the ordinate is the decrease in output in db and the actually measured values on each specimen were plotted to give curves 1 to 8 corresponding to samples 1 to 8 of the example. As indicated by the curves in the figure, the magnetic recording tapes in accordance with the present invention (samples Nos. 1 to 4) exhibited little decrease in output, while the comparative tapes (samples Nos. 5 to 8) exhibit at least 2 db of decrease in output.

In magnetic recording mediums of the present invention to be utilized, for example, as audiotape, since the magnetizable layer of such tape ordinarily is employed in a thickness of about 12$\mu$, the $CrO_2$-containing surface layer should be provided in a thickness of at least about 5$\mu$ for maximum effect. On the other hand, in videotapes, the thickness of the magnetizable layer is ordinarily less, for example, about 4$\mu$, and advantageous effects of the present invention may be obtained by employing a $CrO_2$-containing surface layer of about 2$\mu$ in thickness.

The $CrO_2$ surface layers of the present invention may contain from 0.1 to 10 wt. percent of the metals as set forth in the above description.

What we claim is:

1. A magnetic recording medium comprising:
a support;
a magnetizable layer deposited on said support comprising finely-divided ferromagnetic particles dispersed in a binder; and
a second outermost ferromagnetic layer, deposited on said magnetizable layer, consisting essentially of powdery $CrO_2$-based ferromagnetic dispersed in a binder.

2. The magnetic recording medium of claim 1 wherein the $CrO_2$-based ferromagnetic consists essentially of $CrO_2$ having from 0.1 to 10 weight percent of the Cr substituted by a metal selected from the group consisting of Te, Sb, Pt, Bi and As.

3. The magnetic recording medium of claim 1 wherein said ferromagnetic particles comprise $\gamma$-$Fe_2O_3$, $Fe_3O_4$, Co-containing $\gamma$-$Fe_2O_3$ or Co-containing $Fe_3O_4$.

4. The magnetic recording medium of claim 1 wherein said powdery $CrO_2$-based ferromagnetic consists esesentially of $CrO_2$.

5. The magnetic recording medium of claim 1 comprising magnetic audio tape wherein said second outermost ferromagnetic layer has a thickness of at least about 5 microns.

6. The magnetic recording medium of claim 1 comprising magnetic video tape wherein said second outermost ferromagnetic layer has a thickness of at least about 2 microns.

7. The magnetic recording medium of claim 5 wherein said magnetizable layer has a thickness of about 12 microns.

8. The magnetic recording medium of claim 6 wherein said magnetizable layer has a thickness of about 4 microns.

References Cited

UNITED STATES PATENTS

| | | | |
|---|---|---|---|
| 3,149,996 | 9/1964 | Wagner et al. | 117—239 |
| 3,476,595 | 11/1969 | Nacci | 117—235 |
| 2,941,901 | 6/1960 | Prill et al. | 117—239 |
| 3,117,093 | 1/1964 | Arthur et al. | 252—62.51 |
| 3,278,263 | 10/1966 | Cox | 252—62.51 X |

MURRAY KATZ, Primary Examiner

B. D. PIANALTO, Assistant Examiner

U.S. Cl. X.R.

252—62.51, 62.54, 62.55